(12) United States Patent
Chan et al.

(10) Patent No.: US 11,979,646 B2
(45) Date of Patent: May 7, 2024

(54) SYSTEM AND METHOD OF EXTRACTING OR INSPECTING A FEATURE OF AN OBJECT USING THERMAL IMAGING, AND A METHOD OF INSPECTING AN OBJECT OF A GARMENT PRODUCT

(71) Applicant: Logistics and Supply Chain MultiTech R&D Centre Limited, Pok Fu Lam (HK)

(72) Inventors: Kin Sun Chan, Pok Fu Lam (HK); Yan Nei Law, Pok Fu Lam (HK); Zi Qiao Lam, Pok Fu Lam (HK)

(73) Assignee: Logistics and Supply Chain MultiTech R&D Centre Limited, Pok Fu Lam (HK)

( * ) Notice: Subject to any disclaimer, the term of this patent is extended or adjusted under 35 U.S.C. 154(b) by 63 days.

(21) Appl. No.: 17/566,776

(22) Filed: Dec. 31, 2021

(65) Prior Publication Data

US 2023/0217087 A1    Jul. 6, 2023

(51) Int. Cl.
  *H04N 23/11*     (2023.01)
  *G06V 10/25*     (2022.01)
  *G06V 10/771*    (2022.01)
  *H01J 61/52*     (2006.01)

(52) U.S. Cl.
  CPC ............. *H04N 23/11* (2023.01); *G06V 10/25* (2022.01); *G06V 10/771* (2022.01); *H01J 61/523* (2013.01); *G06T 2207/10048* (2013.01); *G06T 2207/30124* (2013.01); *G06T 2207/30204* (2013.01)

(58) Field of Classification Search
  CPC ....... H04N 23/11; G06V 10/25; G06V 10/771
  USPC ......................................... 348/243
  See application file for complete search history.

(56) References Cited

U.S. PATENT DOCUMENTS

2006/0262971 A1* 11/2006 Foes .................. G06T 7/97
                                                       382/141
2018/0025484 A1*  1/2018 Burton ............. G06T 17/205
                                                       382/141

\* cited by examiner

*Primary Examiner* — Joel W Fosselman
(74) *Attorney, Agent, or Firm* — Renner, Kenner, Greive, Bobak, Taylor & Weber

(57) ABSTRACT

A system and method of extracting or inspecting a feature of an object using thermal imaging, and a method of inspecting an object of a garment product. The system includes a source of thermal influence arranged to heat or cool an object; an imager arranged to capture a plurality of images of the object when the object is subjected to the thermal influence; and an image processor arrange to processing the plurality of images and to distinguish a feature of interest from the other portions of the object presented on the plurality of images.

36 Claims, 6 Drawing Sheets

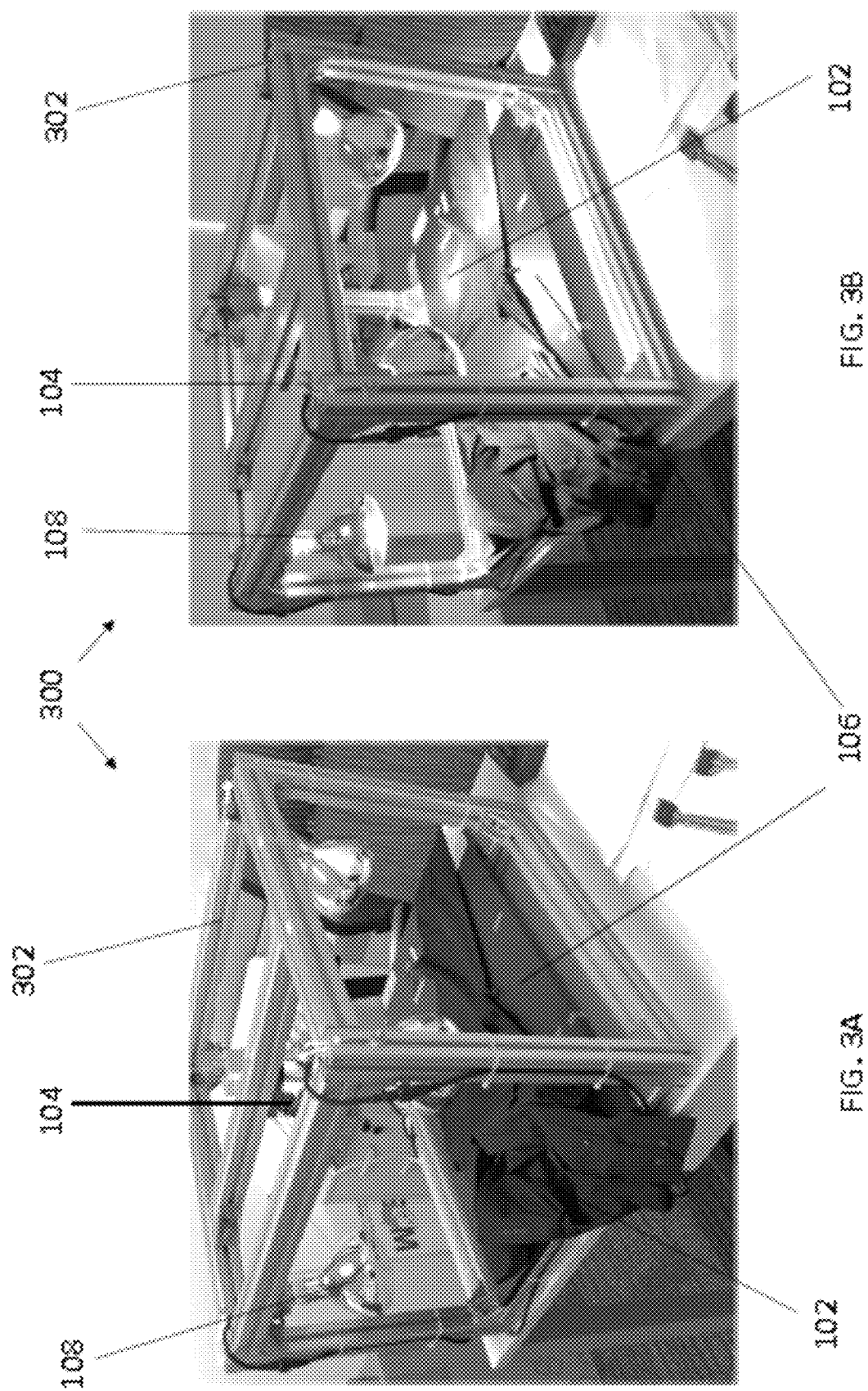

SYSTEM AND METHOD OF EXTRACTING OR INSPECTING A FEATURE OF AN OBJECT USING THERMAL IMAGING, AND A METHOD OF INSPECTING AN OBJECT OF A GARMENT PRODUCT

TECHNICAL FIELD

The present invention relates to a system and method of extracting or inspecting a feature of an object using thermal imaging, and particularly, although not exclusively, to a system and method for inspecting or measuring a feature of a garment product using computer vision.

BACKGROUND

In textile industry, size and dimension of different portions or features of a garment product are need to be inspected to ensure specifications of the product as desired. For example, manual inspection may be used to measure size for apparel specification. However, manual inspection is time-consuming and labour-intensive. Moreover, manual measurements could be inaccurate and with variation.

SUMMARY OF THE INVENTION

In accordance with a first aspect of the present invention, there is provided a method of extracting a feature of an object using thermal imaging, comprising the steps of: heating or cooling an object with a source of thermal influence; capturing a plurality of images of the object when the object is subjected to the thermal influence; and processing the plurality of images using a predetermined image processing method to distinguish a feature of interest from the other portions of the object presented on the plurality of images.

In an embodiment of the first aspect, a temperature gradient between the feature of interest and the other portions of the object is generated by heating or cooling the object.

In an embodiment of the first aspect, the source of thermal influence comprises a heat source.

In an embodiment of the first aspect, the heat source includes a thermal heater and/or at least one electric lamp.

In an embodiment of the first aspect, the source of thermal influence further includes a platform arranged to dissipate heat from the object placed thereon.

In an embodiment of the first aspect, the platform comprises a metal surface.

In an embodiment of the first aspect, the feature of interest includes a thickness different from the other portions of the object when placed on the platform.

In an embodiment of the first aspect, the platform is further arranged to increase the temperature gradient generated between the feature of interest and the other portions of the object, and/or a temperature different between the object and a background environment being captured, when the object is subjected to the thermal influence.

In an embodiment of the first aspect, the step of capturing a plurality of images of the object comprises the step of capturing a series of images of the object when a temperature of the object is changing due to the thermal influence.

In an embodiment of the first aspect, the series of images is arranged to represent a rate of change of temperature of each of the feature of interest and the other portions of the object during the heating or cooling process.

In an embodiment of the first aspect, the step of processing the plurality of images comprises the step of determining the rate of change of temperature using a fast Fourier Transform method.

In an embodiment of the first aspect, the step of processing the plurality of images comprises the step of determining at least one edge between the feature of interest and the other portions of the object adjacent to the feature of interest.

In an embodiment of the first aspect, the method further comprises the step of extracting a phase image based on the plurality of images being captured when the object is subjected to the thermal influence.

In an embodiment of the first aspect, the method further comprises the step of identifying the feature of interest based on the at least one edge being determined and connected at two distanced ends.

In an embodiment of the first aspect, the two distanced ends are indicated by two marking pins.

In an embodiment of the first aspect, the method further comprises the step of generating an output image marked with the at least one edge.

In an embodiment of the first aspect, the feature of interest is identified by a shortest path passing through the at least one edge and the two distanced ends.

In accordance with a second aspect of the present invention, there is provided a method of inspecting an object of a garment product; comprising the step of: extracting the feature of the garment product using thermal imaging according to the method of the first aspect; and displaying an output image rendering the feature of interest distinguishable from the other portions of the garment product presented on the output image.

In an embodiment of the second aspect, the feature of interest includes a roll line in the garment product.

In an embodiment of the second aspect, the method further comprises the step of measuring a dimension of the roll line being identified.

In accordance with a third aspect of the present invention, there is provided a system for inspecting a feature of an object using thermal imaging, comprising: a source of thermal influence arranged to heat or cool an object; an imager arranged to capture a plurality of images of the object when the object is subjected to the thermal influence; and an image processor arrange to processing the plurality of images and to distinguish a feature of interest from the other portions of the object presented on the plurality of images.

In an embodiment of the third aspect, the source of thermal influence is arranged to generate a temperature gradient between the feature of interest and the other portions of the object by heating or cooling the object.

In an embodiment of the third aspect, the source of thermal influence comprises a heat source.

In an embodiment of the third aspect, the heat source includes a thermal heater and/or at least one electric lamp.

In an embodiment of the third aspect, the source of thermal influence further includes a platform arranged to dissipate heat from the object placed thereon.

In an embodiment of the third aspect, the platform comprises a metal surface.

In an embodiment of the third aspect, the feature of interest includes a thickness different from the other portions of the object when placed on the platform.

In an embodiment of the third aspect, the platform is further arranged to increase the temperature gradient generated between the feature of interest and the other portions of the object, and/or a temperature different between the object and a background environment being captured by the imager, when the object is subjected to the thermal influence.

In an embodiment of the third aspect, the imager is further arranged to capture a series of images of the object when a temperature of the object is changing due to the thermal influence.

In an embodiment of the third aspect, the image processor is arranged to determine the rate of change of temperature of each of the feature of interest and the other portions of the object based on the series of images of the object captured by the imager during the heating or cooling process.

In an embodiment of the third aspect, the image processor is further arranged to determine at least one edge between the feature of interest and the other portions of the object adjacent to the feature of interest.

In an embodiment of the third aspect, the image processor is further arranged to extract a phase image based on the plurality of images being captured when the object is subjected to the thermal influence.

In an embodiment of the third aspect, the image processor is further arranged to identify the feature of interest based on the at least one edge being determined and connected at two distanced ends.

In an embodiment of the third aspect, the two distanced ends are indicated by two marking pins.

In an embodiment of the third aspect, the marking pins are anchors arranged to anchor the object on the platform.

In an embodiment of the third aspect, the image processor is further arranged to generate an output image marked with the at least one edge.

In an embodiment of the third aspect, the feature of interest is identified by a shortest path passing through the at least one edge and the two distanced ends.

In an embodiment of the third aspect, the object is a garment product.

In an embodiment of the third aspect, the feature of interest includes a roll line in the garment product.

BRIEF DESCRIPTION OF THE DRAWINGS

Embodiments of the present invention will now be described, by way of example, with reference to the accompanying drawings in which:

FIG. 3A is a perspective view of a system for inspecting a feature of an object using thermal imaging in accordance with an embodiment of the present invention;

FIG. 3B is a perspective view of the system FIG. 3A, in which the lamps are energized to heat up the garment product being placed on the metal plate;

DETAILED DESCRIPTION OF THE PREFERRED EMBODIMENT

The inventors have, through their own research, trials and experiments, devised that computer vision may be employ to automate the process measurement of the features of a garment product. However, RGB image is found to be unable to capture low contrast feature such as armholes.

In accordance with a preferred embodiment of the present invention, there is shown a system for inspecting an object, such as a garment product, using a thermal imaging method. Preferably, a thermal camera mounted to may be used to record digital thermal image sequence of garment with different thickness. The image sequence may then be processed by a phase image extractor which converts the thermal video information to phase information, such that the phase information may allow an image analyzer to segments regions with different thickness to extract low contrast regions.

Figure 1:
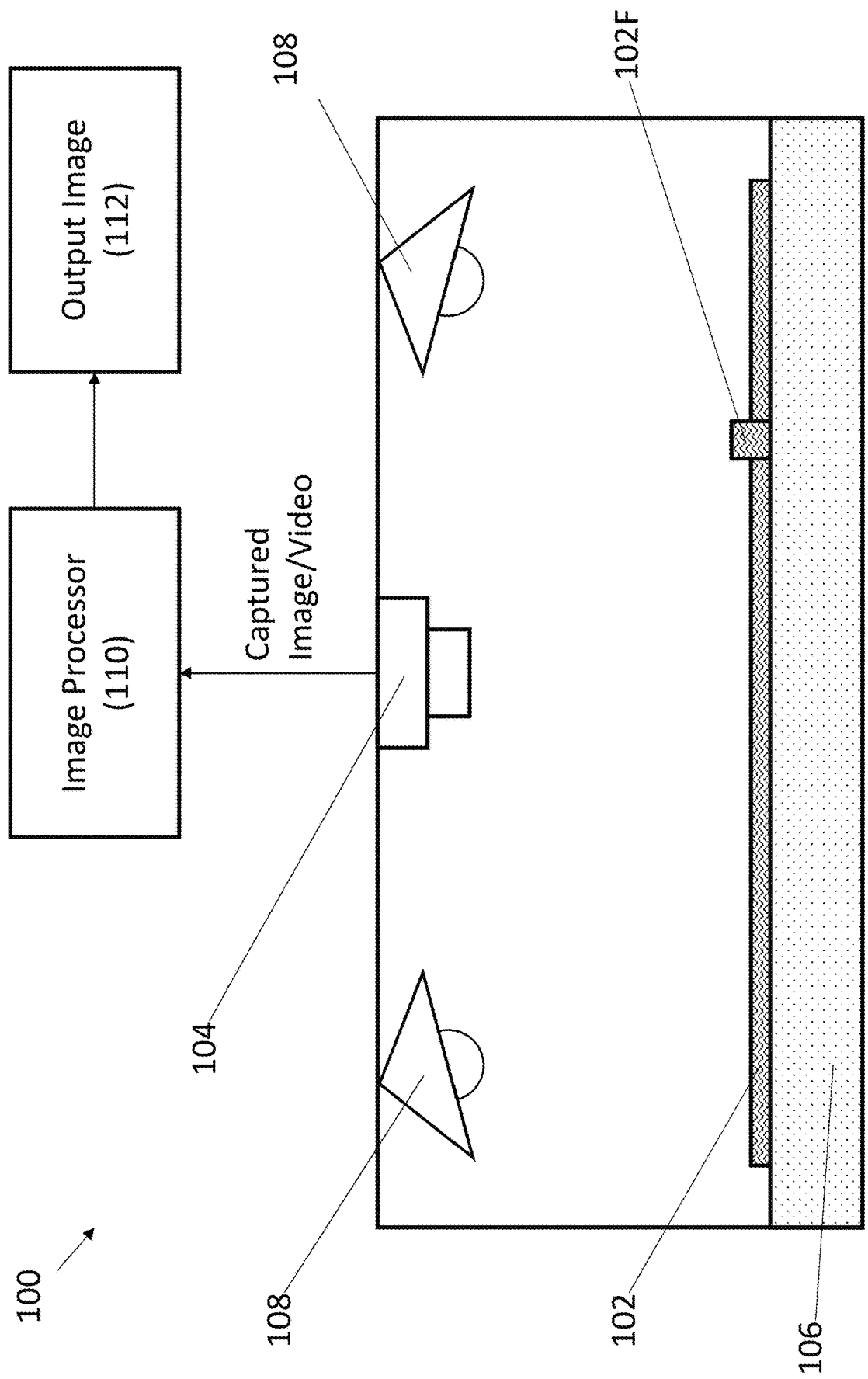
FIG. 1 shows is a schematic diagram showing a system for inspecting a feature of an object using thermal imaging in accordance with an embodiment of the present invention.

With reference to FIG. 1, there is shown an embodiment of a system 100 for inspecting a feature of an object using thermal imaging, comprising: source of thermal influence arranged to heat or cool an object 102; an imager 104 arranged to capture a plurality of images of the object 102 when the object is subjected to the thermal influence; and an image processor arrange to processing the plurality of images and to distinguish a feature of interest 102F from the other portions of the object 102 presented on the plurality of images.

In this embodiment, the system 100 includes a platform 106 for an object of interest 102, such as a T-shirt or any other garment product to be placed thereon, and above the platform 106, a heat source and an imager such as a camera 104 mounted at a position elevated from the platform surface.

Referring to FIG. 1, the heat source includes two electric lamps 108, such as bulb lamps arrange to apply a thermal influence, e.g. by radiation, to the object 102 placed on the platform 106. In an alternative embodiment, different numbers of heating lamps may be included to form an array of heating source to provide a uniform heating coverage across a larger surface area on the platform 106 such that the thermal influence on different parts of the object 102 is substantially the same.

Alternatively, other forms of heating source, such as electric heaters with resistive coils/tubes, lamp tubes, or hot plates may be used to apply heat to the object to be inspected. These example sources of thermal influences are arranged to increase the overall temperature of the object 102 placed on the platform 106, however in some alternative embodiments, or in accordance with an alternative operation of the system, thermal influence to the object may be applied in form of a cooling down process, by dissipating or removing heat from the object 102 placed on the platform 106.

Preferably, the platform 106 is in a material which dissipate heat relatively quickly to facilitate cooling of the object. For example, the platform 106 comprises a metal surface such that it may effective withdraw heat from the object 102 which has a higher temperature than that at the metal surface. Optionally, the metal surface or the metal plate may be in contact with additional cooling means such as cooling tubes or coil to further enhance the cooling effect of the platform 106.

The imager 104 may be a still image camera or a video camera, both may capture a plurality of images, preferably a series of images which combine to form a video stream to record the any changes of the object 102 during a predetermined period of time. Preferably, the imager 104 is capable of thermal imaging or is responsive to record light information also in the infrared spectrum to capture the thermal responses of the object 102 when subjected to the applied thermal influences. Alternatively, thermal camera may be used to accurately record the temperature (change) of different portions of the object 102 during the heating or cooling process.

Preferably, the captured images may be further processed by an image processor 110 to distinguish at least one feature of interest from the other portions of the object presented on the plurality of images. For example, in a T-shirt or other similar garment product, the length of a roll line at the armhole is directly related to the size of the armhole, therefore by extracting the roll line from the image of the T-shirt will allow an accurate measurement of the size of the armhole by measuring the length of the roll line, e.g. by using computer vision to analyse the output image 112 generated by the image processor 110.

Preferably, the feature of interest 102F, such as a roll line, includes a thickness different from the other portions of the T-shirt when placed on the platform 106, therefore when both the roll line as well as other portions of the garment product are subjected to the uniform heat energy supplied by the bulb lamps 108 or heater, the roll line, or the portions which are thicker, has a different rate of change of temperature when compared to the thinner portions of the garment product under the same amount of heat applied to these portions. Accordingly, under such heating/cooling condition, a temperature gradient between the feature of interest 102F and the other portions of the object 102 is generated, and such temperature gradient between the adjacent portions allows the image processor 110 to better distinguish the two adjacent portions with different thickness.

Figure 2A:
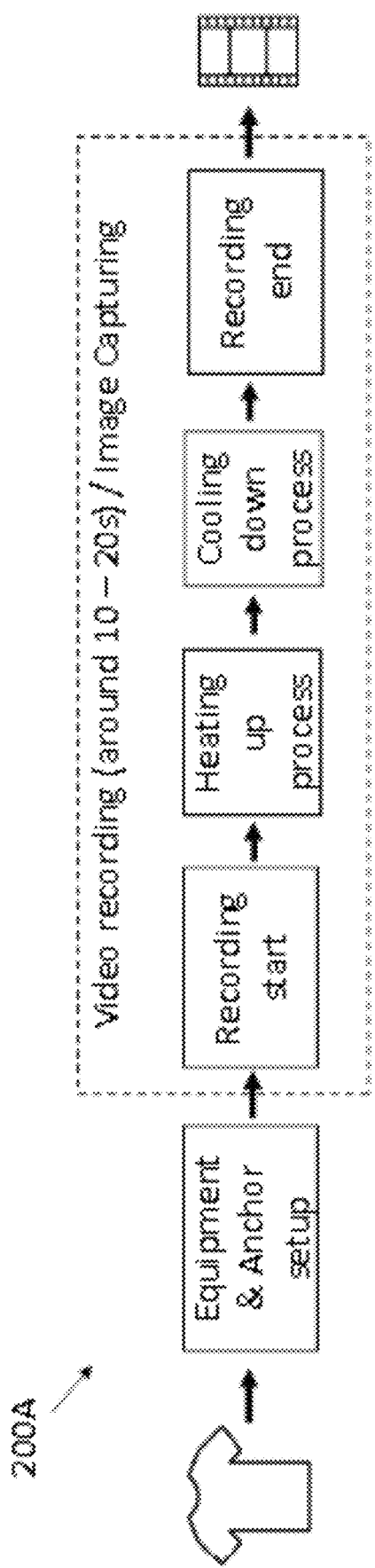
FIGS. 2A and 2B illustrates the process for operating the system in FIG. 1 to identify a roll line in a garment product.
Figure 2B:
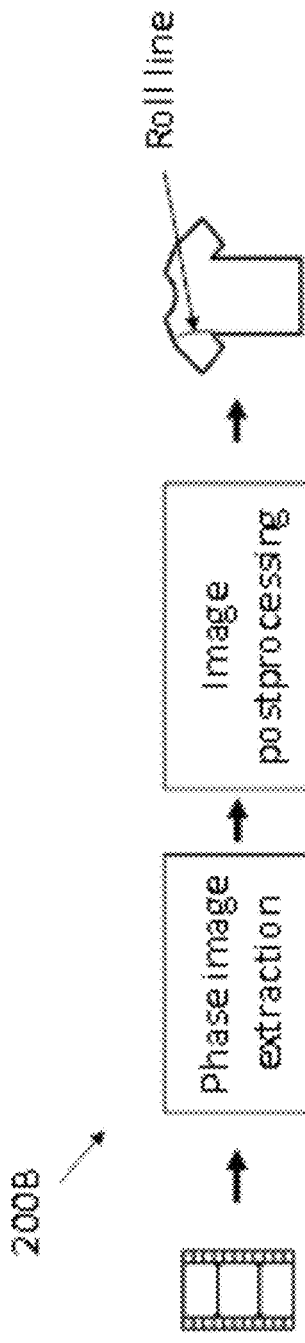

With reference also to FIGS. 2A and 2B, there is shown an example operation of extracting a feature of an object using thermal imaging in accordance with embodiments of the present invention. In the first part 200A of the process, referring to FIG. 2A, the object or the garment product is placed and anchored on the platform as described above, then the imager start capturing a plurality of images of the object when the object is subjected to the thermal influence, including when the heater is on such that the temperature of the object increases, and when the heater is off such that the object start cooling down by losing heat to the environment and/or by the heat sink effect provided by the metal plate underneath the object. After recording both in the heating phase and the cooling phase, the image recording may terminate to generate a series of images or a video stream which record the change of the different portions of the object under the thermal influence.

Then in the second part of the process, which may be considered as the image processing stage. Referring to FIG. 2B, the process 200B starts with extracting a phase image based on the plurality of images being captured when the object is subjected to the thermal influence. The phase image includes a much clearer visually distinguishable feature of interest when compared to a simple optical image taken by an RGB camera. With the extracted phase image, the image may be further processed to extract the features of interest from the whole image for further analysis, e.g. by identifying edges which separate the adjacent portions and/or the boundaries of the feature of interest. Advantageously, the processed image allow the system to measure a dimension of the roll line or any feature of interest being identified, using computer vision or image analysis.

With reference to FIGS. 3A and 3B, there is shown an example setup and operation of the system 300 in accordance with an embodiment of the present invention. In this example, the system 300 includes a thermal camera 104 connected to a computer, and the camera 104 is mounted on a metal frame 302 in a position above the lower platform 106 including a metal plate. The thermal camera 104 is placed on top of the clothes 102, which is on the metal plate, in order to capture the thermal change of the clothes under the bulb lamps 108.

In addition, four bulb lamps 108 are mounted at the four corners of the top of the metal frame 302 forming an array of heater for heating up the garment product 102 to be inspected. As shown in FIG. 3B, the lamps 108 are oriented to supply a uniform heating on the entire metal plate or the surface of the platform 106, such that different portions of the object 102 may be heated uniformly, when the heaters or the lamps 108 are energized.

Preferably, as the metal plate of the platform 106 and the textile material of the clothes 102 have different thermal conductivities, the platform 106 is further arranged to increase the temperature gradient generated between the feature of interest 102F and the other portions of the object 102, and/or a temperature different between the object 102 and a background environment being captured, when the object 102 is subjected to the thermal influence. Effectively, the contrast of the features 102F with a larger temperature gradient is further enhanced, such that the extracted features 102F will become more distinguishable when observed from the extracted phase image.

Figure 4:
FIG. 4 is a top perspective view showing the garment product being anchored on the metal plate of the system of FIG. 3A.

With reference to FIG. 4, two anchors 304, which may be made of different material from the background like push pin magnets, are placed to be close to the armhole area of the clothes on the metal plates. Preferably, the anchors 304 also indicate the two distanced ends connecting the edges of the features 102F. For example, the starting point and the end point of the roll line 102F near the armhole are marked by these pins for enhancing the search in the image postprocessing process.

With reference to FIGS. 5A to 5F, wherein is shown an example set of images of the garment product 102 in FIGS. 3A to 4 captured during a heating and cooling process of 18 seconds. In this example, the images were extracted at equal time interval, and the overall temperature of the entire platform and the object increases from FIG. 5A to 5F in a consecutive manner.

In this experiment, the recording started to record the thermal change of heating up and cooling down process with the thermal camera 104 connected to the computer. As described earlier, the heating up process includes turning on the four bulb lamps 108 for heating up the clothes 102 in the recording. And then, the process continue in the cooling down process which includes turning off the four bulb lamps 108 for cooling down the clothes in the recording.

Figure 5A:
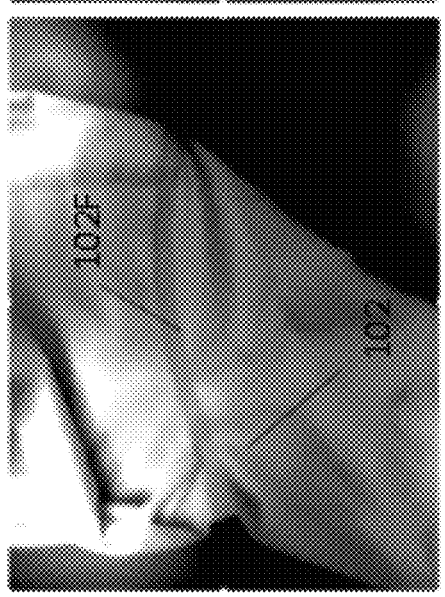
FIG. 5A to 5F are images taken by the imager of the system of FIG. 3A during when the garment product is subjected to a thermal influence.
Figure 5B:
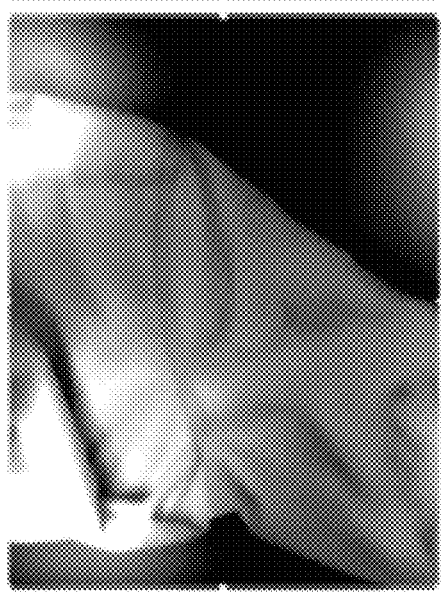
Figure 5C:
Figure 5D:
Figure 5E:

In this example, as shown in FIG. 5A, the roll line 102F is initially "darker" than the adjacent portions of the garment product 102, and the roll line 102F slowly fade out to become nearly indistinguishable from the adjacent portions as shown in FIGS. 5C and 5D, this is because the roll line 102F is slightly thicker than the adjacent portions and therefore the rates of change of temperature in these different portions are slightly different, causing the change of contrast due to the existing temperature gradient.

Figure 5F:
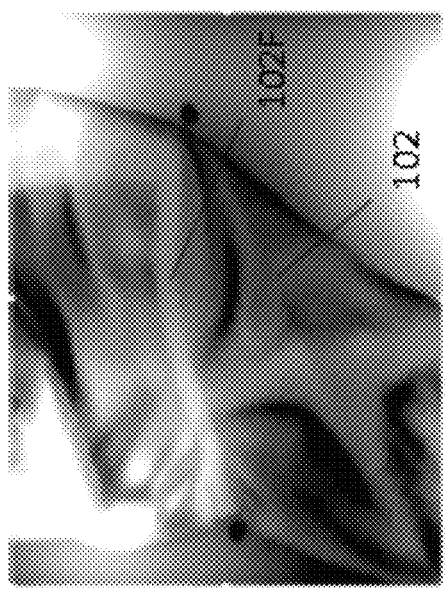

Subsequently, after the heater was turned off, the garment product 102 entered the cooling down process, in which the thinner portions dissipate heat in a rate faster than that of the thicker roll line 102F, such that the temperature of these thinner portions dropped faster due to the efficient heat sink of the metal surface below the garment product 102. As a result, the roll line 102F becomes hotter than the adjacent portion and as shown in the image of FIG. 5F it becomes "brighter" than the adjacent portions which are comparatively cooler.

Afterwards, the video or the captured images were sent to the image processor for further process.

Figure 6B:
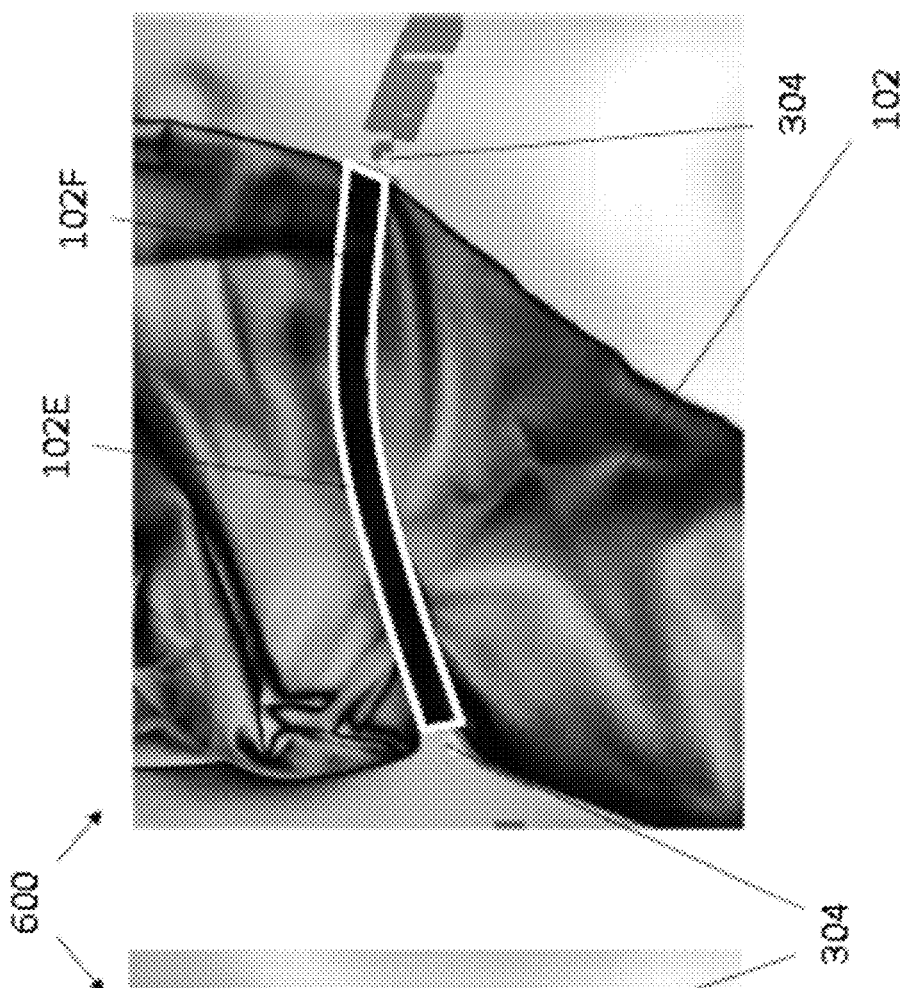
FIGS. 6A and 6B are post-processed phase images generated based on the plurality of images of FIGS. 5A to 5F showing clearly the roll line of the garment product.
Figure 6A:
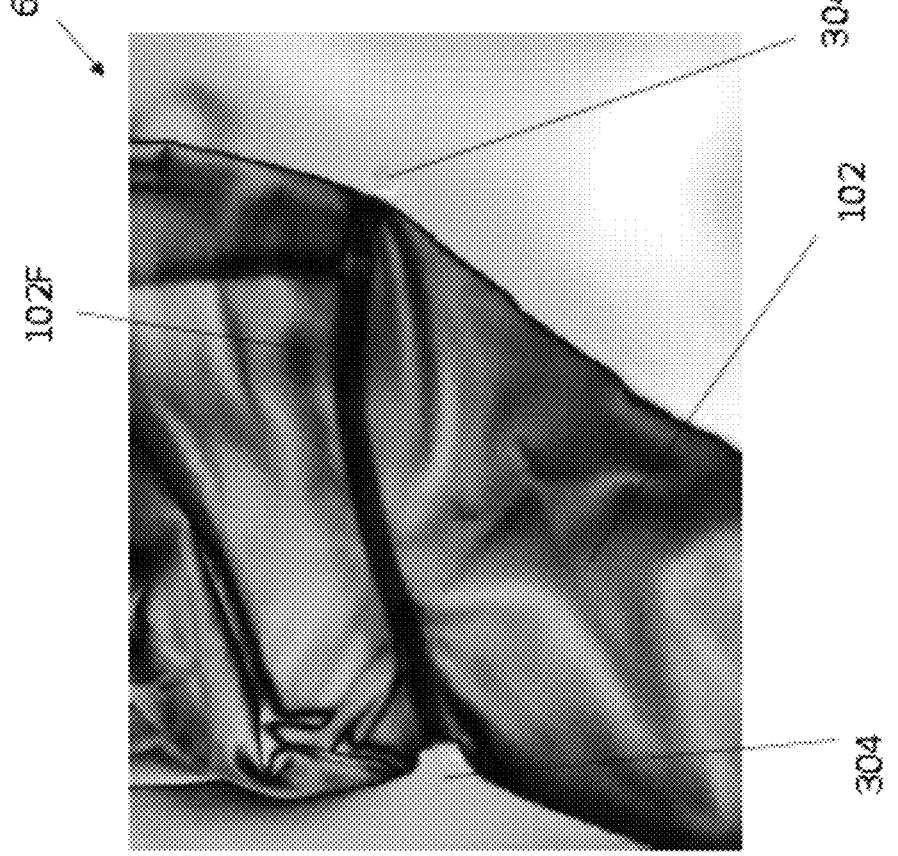

With reference to FIGS. 6A and 6B, there is shown post processed images generated based on the captured images or video of FIGS. 5A to 5F. In this processing stage, garment phase extraction may be carried out. The phase information may be used to show the thermal difference of the clothes 102 and the background by comparing their periods of thermal change, which can be determined by a fast Fourier transform (FFT) method.

In one example method of feature extraction, the feature of interest 102F based on at least one edge 102E being determined and connected at two distanced ends indicated by the marking pins 304. After the phase image is formed by garment phase extraction, the image preprocessing stage is developed to find the roll line 102F near the armhole of the clothes 102 based on two anchor points 304. As the two anchor points 304 which are made of different material other than the background and the clothes 102 have unique phase information in the phase image, two marks in the phase image are formed at their locations and they can be extracted by the color contrast of the phase image. After two marks are found, the edges 102E are also extracted in the phase image by the edge detection method. By using two marks and the edges, the roll line 102F is extracted by a shortest path which passes through the identified edges and the two distanced ends.

Finally, the roll line 102F is located and shown, e.g. on an output image 600 generated by the image processor. Preferably, the output image 600 may clearly render the feature of interest 102F distinguishable from the other portions of the garment product 102 presented on the output image 600. In addition, marks that highlight the identified features 102F, such as the determined edges 102E may be added for easier referencing, and/or for measuring a dimension of the roll line 102F being identified.

These embodiments may be advantageous in that features of a garment product which are not visually identifiable may be extracted using thermal imaging, thereby allowing further operation such as product inspection and measurement of the features to be carried out using computer vision, and eliminate the need of manually inspecting and/or measuring a number of key dimensions of the product.

It will also be appreciated that where the methods and systems of the present invention are either wholly implemented by computing system or partly implemented by computing systems thus any appropriate computing system architecture may be utilised. This will include standalone computers, network computers and dedicated hardware devices. Where the terms "computing system" and "computing device" are used, these terms are intended to cover any appropriate arrangement of computer hardware capable of implementing the function described.

It will be appreciated by persons skilled in the art that the term "database" may include any form of organized or unorganized data storage devices implemented in either software, hardware or a combination of both which are able to implement the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method of measuring a portion of an object for ensuring product specifications are met, comprising the steps of:
   heating or cooling an object with a source of thermal influence;
   capturing a plurality of images of the object when the object is subjected to the thermal influence;
   processing the plurality of images using a predetermined image processing method to distinguish a feature of interest from other portions of the object presented on the plurality of images; and
   measuring a dimension of the feature of interest for ensuring product specifications are met, wherein the step of processing the plurality of images comprises:
      determining at least one edge between the feature of interest and the other portions of the object adjacent to the feature of interest; and
      extracting a phase image based on the plurality of images being captured when the object is subjected to the thermal influence.

2. The method of claim 1, wherein a temperature gradient between the feature of interest and the other portions of the object is generated by heating or cooling the object.

3. The method of claim 2, wherein the source of thermal influence comprises a heat source.

4. The method of claim 3, wherein the heat source includes a thermal heater and/or at least one electric lamp.

5. The method of claim 3, wherein the platform is further arranged to increase the temperature gradient generated between the feature of interest and the other portions of the object, and/or a temperature different between the object and a background environment being captured, when the object is subjected to the thermal influence.

6. The method of claim 3, wherein the source of thermal influence further includes a platform arranged to dissipate heat from the object placed thereon.

7. The method of claim 6, wherein the platform comprises a metal surface.

8. The method of claim 6, wherein the feature of interest includes a thickness different from the other portions of the object when placed on the platform.

9. The method of claim 1, wherein the step of capturing a plurality of images of the object comprises the step of capturing a series of images of the object when a temperature of the object is changing due to the thermal influence.

10. The method of claim 9, wherein the series of images is arranged to represent a rate of change of temperature of each of the feature of interest and the other portions of the object during the heating or cooling process.

11. The method of claim 10, wherein the step of processing the plurality of images comprises the step of determining the rate of change of temperature using a fast Fourier Transform method.

12. The method of claim 1, further comprising the step of identifying the feature of interest based on the at least one edge being determined and connected at two distanced ends.

13. The method of claim 12, wherein the two distanced ends are indicated by two marking pins.

14. The method of claim 12, further comprising the step of generating an output image marked with the at least one edge.

15. The method of claim 12, wherein the feature of interest is identified by a shortest path passing through the at least one edge and the two distanced ends.

16. The method of claim 1, wherein the object is a garment.

17. A method of inspecting a feature of a garment product comprising the steps of:
   heating or cooling a garment product with a source of thermal influence;
   capturing a plurality of images of the garment product when the object is subjected to the thermal influence;
   processing the plurality of images using a predetermined image processing method to distinguish and extract a feature of interest from other portions of the object presented on the plurality of images; and
   displaying an output image rendering the feature of interest distinguishable from the other portions of the garment product presented on the output image.

18. The method of claim 17, wherein the feature of interest includes a roll line in the garment product.

19. The method of claim 18, further comprising the step of measuring a dimension of the roll line being identified.

20. A system for measuring a portion of an object, using thermal imaging, comprising:
   a source of thermal influence arranged to heat or cool an object;
   an imager arranged to capture a plurality of images of the object when the object is subjected to the thermal influence; and
   an image processor arranged to process the plurality of images and to distinguish a feature of interest from other portions of the object presented on the plurality of images, and to measure a dimension of the feature of interest for ensuring product specifications are met, wherein the image processor is further arranged to determine at least one edge between the feature of interest and the other portions of the object adjacent to the feature of interest, and to extract a phase image based on the plurality of images being captured when the object is subjected to the thermal influence.

21. The system of claim 20, wherein the source of thermal influence is arranged to generate a temperature gradient between the feature of interest and the other portions of the object by heating or cooling the object.

22. The system of claim 21, wherein the source of thermal influence comprises a heat source.

23. The system of claim 22, wherein the heat source includes a thermal heater and/or at least one electric lamp.

24. The method of claim 22, wherein the source of thermal influence further includes a platform arranged to dissipate heat from the object placed thereon.

25. The system of claim 24, wherein the platform comprises a metal surface.

26. The system of claim 24, wherein the feature of interest includes a thickness different from the other portions of the object when placed on the platform.

27. The system of claim 22, wherein the platform is further arranged to increase the temperature gradient generated between the feature of interest and the other portions of the object, and/or a temperature different between the object and a background environment being captured by the imager, when the object is subjected to the thermal influence.

28. The system of claim 20, wherein the imager is further arranged to capture a series of images of the object when a temperature of the object is changing due to the thermal influence.

29. The system of claim 28, wherein the image processor is arranged to determine the rate of change of temperature of each of the feature of interest and the other portions of the object based on the series of images of the object captured by the imager during the heating or cooling process.

30. The system of claim 20, wherein the image processor is further arranged to identify the feature of interest based on the at least one edge being determined and connected at two distanced ends.

31. The system of claim 30, wherein the two distanced ends are indicated by two marking pins.

32. The system of claim 31, wherein the marking pins are anchors arranged to anchor the object on the platform.

33. The system of claim 30, wherein the image processor is further arranged to generate an output image marked with the at least one edge.

34. The system of claim 30, wherein the feature of interest is identified by a shortest path passing through the at least one edge and the two distanced ends.

35. The system of claim 20, wherein the object is a garment product.

36. The system of claim 35, wherein the feature of interest includes a roll line in the garment product.

* * * * *